C. P. BLACHLY.
LIQUID METER.
APPLICATION FILED AUG. 18, 1913.

1,178,900. Patented Apr. 11, 1916.

WITNESSES:
Wm Hudson
J. H. Perrault

INVENTOR
Charles P. Blachly
BY
Edward N. Pagelsen,
ATTORNEY

UNITED STATES PATENT OFFICE.

CHARLES P. BLACHLY, OF DETROIT, MICHIGAN.

LIQUID-METER.

1,178,900.

Specification of Letters Patent. Patented Apr. 11, 1916.

Application filed August 18, 1913. Serial No. 785,243.

*To all whom it may concern:*

Be it known that I, CHARLES P. BLACHLY, a citizen of the United States, and resident of Detroit, in the county of Wayne and State of Michigan, have invented a new and useful Liquid-Meter, of which the following is a specification.

This invention relates to means for measuring water, fuel and illuminating oils, and other liquids, and its object is to provide a simple, effective and reliable meter which can be cheaply constructed, and which will operate under pressure and under the least favorable conditions.
This invention consists in combination with a measuring chamber, of a pair of connected valves for controlling the passage of the liquid into and out of the measuring chamber, of a pair of floats for moving said valves, and means connected to said floats whereby each float prevents the operation of the other float until the liquid in the measuring chamber has reached one or the other of two predetermined levels.
It further consists, in combination with the above mechanism, of a storage chamber into which the contents of the measuring chamber may be discharged, means being provided for insuring the pressure remaining the same in both chambers.

Figure 1:
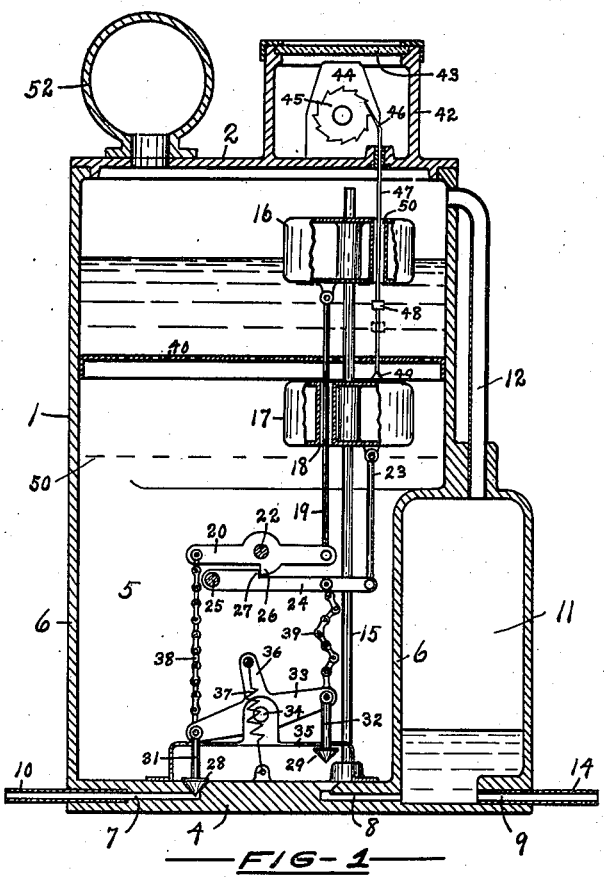
Figure 2:
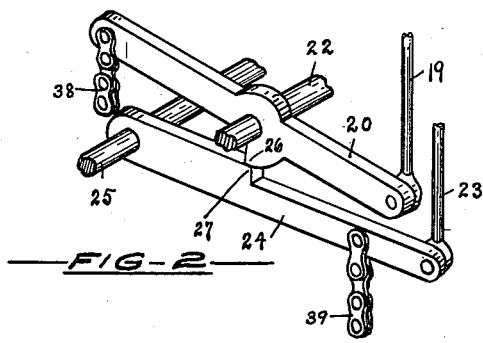
Figure 3:
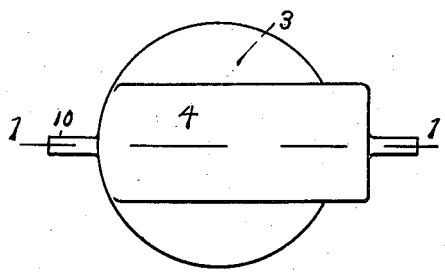

In the accompanying drawings, Figure 1 is a vertical section on the line 1—1 of Fig. 3. Fig. 2 is a perspective of the controlling levers. Fig. 3 is a bottom plan of the instrument on a somewhat smaller scale.

Similar reference characters refer to like parts throughout the several views.

In the present construction, the case of the instrument constitutes a measuring chamber and a valve chamber. The measuring chamber is a float chamber and its dimensions and proportions will depend upon the desired capacity of the meter. The chamber is shown to be cylindrical, although any other desired shape may be used. The shell 1 connects to a top 2 and to a partial bottom 3, which, in turn, connects to the valve chamber, which has a bottom 4, sides 5, and ends 6. The bottom has passages 7, 8 and 9. An inlet pipe 10 connects into the passage 7 in the base.

A storage chamber 11, preferably formed on one side of the valve chamber, connects to the top of the measuring chamber in any desired manner, preferably by the pipe 12. It also connects to the valve chamber, the passage 8 serving this purpose. A discharge pipe 14 connects to the passage 9 and thereby to the storage chamber.

A vertical post 15, preferably a tube, connecting to the bottom 3, guides and positions the two floats 16 and 17. The lower float 17 has a passage 18 through which the link 19 passes to connect the upper float to the right end (Fig. 1) of the lever 20, which is pivotally mounted on the rod 22 that extends across through the valve chamber. The link 23 connects the lower float to the right end of the lever 24, which is pivoted on the rod 25 that also extends across through the valve chamber. The lever 20 has a lug 26 which engages the shoulder 27 on the lever 24 while the measuring chamber is discharging, the parts being in the positions shown in Fig. 1.

Valve seats are formed at the inner end of the passage 7 and the adjacent end of the passage 8, which passages can therefore be closed by the valves 28 and 29 respectively, having rods 31 and 32 that connect to the ends of the lever 33 mounted on a pivot 34 on the bracket 35. This lever has an upwardly projecting arm 36 to which the spring 37 connects and normally holds one of the valves in its seat, completing the movement of the valves after the movement of the lever 33 has been more than onehalf performed. A flexible connector of any desired construction, such as the chain 38, connects the lever 20 to the left end of the lever 33, while the connector 39 connects the other end of the lever 33 to the lever 24.

A perforated plate 40 between the floats prevents surging of the contents of the float chamber in case the instrument is rocked, as when the meter is mounted in a vehicle or launch.

On the top 2, inclosed in an airtight case 42, having a window 43, is shown a counter 44 having an actuating wheel 45 that is engaged by a pawl 46 at the upper end of a slidable rod 47, having a collar 48 and a foot 49, which rod extends through a passage 50 in the float 16.

The operation of the several parts is as follows: When the parts are as shown in the drawing the contents of the measuring chamber are running out through the passage 8 into the storage chamber 11. When the level of the liquid in the measuring chamber falls below the float 16, that will be sustained by the link 19 until the level falls to about the dotted line 50, when the lower float and lever 24 will have swung down sufficiently to carry the shoulder 27 out of the path of the lug 26 on the lever 20. This permits the lever 20 to swing on its pivot very suddenly under the weight of the float 16, and the left end of the lever will jerk up on the chain 38 sufficiently strongly to swing the lever 33 and the arm 36 over the center, so that, if necessary, the spring 37 may complete the movement of the valves, forcing the valve 29 onto its seat and closing the passage 8. Liquid will now flow in through the passage 7, and slowly rise above the float 17, which is held down by the lug 26 resting on top of the shoulder 27, as shown in Fig. 2. As soon as the upper float 16 reaches the position shown in Fig. 1, the lug 26 will be swung from above the lug 27, and the float 17 will be permitted to rise to the position shown in Fig. 1, which it does so suddenly that the lever 24 will jerk up on the chain 39 sufficiently strongly to carry the lever 33 and the valves to the position there shown. During the last portion of the downward movement of the float 16, it will contact with the collar 48 on the rod 47 and carry it to the dotted position, and during the last portion of the rise of the lower float 17, it will push up on the foot 49 and move the rod 47 back to normal position. The number of cycles of the meters can thereby be registered.

It will be noted that if the flow from the pipe 14 be less than that through the passage 8, the excess of liquid will be stored in the chamber 11, the air passing up through the pipe 12 into the measuring chamber, and that when the measuring chamber is filling, the air will pass down the pipe 12. But if the chamber 11 is already partly or entirely full, the air in the measuring chamber becomes compressed and may attain a pressure equal to that of the incoming liquid. In such case it may be desirable to enlarge the air space, which may be done by securing an air chamber 52 to the top, the size of this chamber depending upon and varying inversely with the pressure of the liquid coming through the pipe 10. This additional air space will often permit the complete charging of the measuring chamber so that the contents will be ready to flow out through the passage 8, a condition which is often more desirable than the reverse, that is, with the liquid flowing into the measuring chamber at the time the flow is arrested.

The proportion and sizes of the different parts of this meter and the details of construction may all be varied by those skilled in the art without departing from the spirit of my invention as expressed in the claims.

I claim:

1. In a meter, the combination of a measuring chamber and a storage chamber having a passage connecting their lower ends and a passage connecting their upper ends, said measuring chamber having an inlet opening and an outlet opening, the latter leading to said storage chamber, valves to control the inlet and outlet opening of the measuring chamber, and a pair of floats to move said valves simultaneously.

2. In a meter, the combination of a measuring chamber and a storage chamber having a passage connecting their lower ends, a valve to close said passage, said measuring chamber having an inlet opening, a valve to close said opening, and means including floats to alternately open either said passage or inlet opening and simultaneously close the other of said two last named elements.

3. In a liquid meter, the combination of a case provided with a bottom having inlet and outlet openings, a valve for each opening, means connecting said valves to cause them to move simultaneously in opposite directions with reference to their seats, a plurality of vertically movable floats in said case, one above the other, connections between said floats whereby the upper float will hold the lower float in its lower position until the upper float has reached a predetermined height and whereby the lower float will keep the upper float in its upper position until the lower float has reached a predetermined depth, and means whereby the lower float may move said valves to open the outlet opening and the upper float may cause the closing of said opening.

4. In a liquid meter, the combination of a case having inlet and outlet openings, floats in said case, connections between said floats whereby one may hold the other in a predetermined position until the first has reached one limit of its movement and the second hold the first at said position until the second has reached said predetermined limit, and means whereby said floats may open and close the outlet and inlet openings.

5. In a liquid meter, the combination of a case having inlet and outlet openings, a rod mounted in the case, a pair of floats slidable thereon, a pair of levers pivoted in said case having engaging projections, means connecting one of the levers to each float, said parts so proportioned and positioned that the lower float will be held in its lower position until the upper float has attained its upper position, and the upper float will be held in its upper position until the lower float has attained its lower position, and a pair of valves connected to said levers and adapted to be moved by said floats to open and close said openings.

6. In a liquid meter, the combination of a case having inlet and outlet openings, a rod mounted in the case, a pair of floats slidable thereon, a pair of levers pivoted in said case having engaging projections, means connecting one of the levers to each float, said parts so proportioned and positioned that the lower float will be held in its lower position until the upper float has attained its upper position, and the upper float will be held in its upper position until the lower float has attained its lower position, a pair of valves connected to said levers and adapted to be moved by said floats to open and close said openings, and means operable by the floats to count the operations of the meter.

7. In a liquid meter, the combination of a case having inlet and outlet openings, a pair of floats therein, a valve for each opening, means connecting said valves, flexible connectors between the floats and valves, and interlocking devices between the floats whereby each is held from movement until the other float has reached the limit of its movement at which time the hitherto restrained float will move one valve onto its seat and the other off its seat.

8. In a liquid meter, a measuring chamber having an inlet and an outlet passage, a valve for each passage, a pair of floats connected to said valves and adapted to move the same to open the outlet passage when the liquid in the chamber has attained a predetermined height and to close said outlet passage and open the inlet passage when the liquid has sunk to a predetermined level, a storage chamber adjacent the measuring chamber and connecting to the outlet passage to receive liquid therefrom, and means connecting the upper ends of said chambers to permit the pressures above the liquids in both chambers to equalize each other.

9. In a liquid meter, a measuring chamber having an inlet and an outlet passage, a valve for each passage, means connected to said valves to move the same to open the outlet passage when the liquid in the chamber has attained a predetermined height and to close said outlet passage and open the inlet passage when the liquid has sunk to a predetermined level, a storage chamber adjacent the measuring chamber and connected to the outlet passage to receive liquid therefrom, and a passage connecting the space above the liquid in the measuring chamber with the space above the liquid in the storage chamber to permit the pressures above the liquids in both chambers to equalize.

10. In a meter, the combination of a case provided with a bottom having inlet and outlet openings, a valve for each opening, means connecting said valves to cause them to move simultaneously in opposite directions with reference to their seats, a plurality of floats in said case, connections between said floats whereby one float will hold another float in its lower position until the first mentioned float has reached a predetermined height and whereby the second mentioned float will keep the first mentioned float in its upper position until the second mentioned float has reached a predetermined depth, and means whereby one of the floats may move said valves to open the outlet opening and the other float may cause the closing of said opening.

In testimony whereof I have signed this specification in the presence of two subscribing witnesses.

CHARLES P. BLACHLY.

Witnesses:
 JAY FULLER,
 EDWARD N. PAGELSEN.